(12) United States Patent
Chow et al.

(10) Patent No.: US 7,311,864 B2
(45) Date of Patent: Dec. 25, 2007

(54) ARTICLES OF MANUFACTURE MADE FROM COFFEE BEAN RESIDUE, AND METHODS FOR MAKING SUCH ARTICLES

(76) Inventors: David Chi-Ping Chow, 2329 Tice Creek Dr., Unit #3, Walnut Creek, CA (US) 94595; Eaman Ochun Tang, 19368 Waterfall Way, Rowland Heights, CA (US) 91748

( * ) Notice: Subject to any disclaimer, the term of this patent is extended or adjusted under 35 U.S.C. 154(b) by 318 days.

(21) Appl. No.: 11/066,706

(22) Filed: Feb. 26, 2005

(65) Prior Publication Data

US 2006/0194900 A1    Aug. 31, 2006

(51) Int. Cl.
*B29C 43/02*    (2006.01)

(52) U.S. Cl. ........................ 264/113; 264/109; 264/115; 264/122; 264/911

(58) Field of Classification Search ..................... None
See application file for complete search history.

(56) References Cited

U.S. PATENT DOCUMENTS

| | | | | | |
|---|---|---|---|---|---|
| 3,499,851 | A | * | 3/1970 | Ligo | ............................... 524/9 |
| 3,686,384 | A | * | 8/1972 | Runton | ........................ 264/122 |
| 3,927,235 | A | * | 12/1975 | Chow | ....................... 428/292.4 |
| 4,364,979 | A | * | 12/1982 | Dutton | ........................... 428/2 |
| H1120 | H | * | 12/1992 | Casey et al. | ................ 521/40.5 |
| 5,688,448 | A | * | 11/1997 | Shutov et al. | ................. 264/54 |

* cited by examiner

*Primary Examiner*—Mary Lynn Theisen
(74) *Attorney, Agent, or Firm*—Gary C. Honeycutt

(57) ABSTRACT

Coffee bean residue is a primary constituent of new thermosetting polymer compositions and articles of manufacture. The articles are made by compression molding and curing of one or more thermosetting polymer resins blended with coffee bean residue. Other additives and fillers may also be included in the compositions.

2 Claims, No Drawings

ARTICLES OF MANUFACTURE MADE FROM COFFEE BEAN RESIDUE, AND METHODS FOR MAKING SUCH ARTICLES

FIELD OF THE INVENTION

The present invention relates to thermosetting polymer resin compositions and to molded articles made from a mixture of such compositions with other materials.

BACKGROUND OF THE INVENTION

The curing of thermosetting resin compositions results in irreversible chemical changes, transforming a fusible and soluble material into a composite that is infusible and insoluble through the formation of covalently cross-linked, thermally stable, three-dimensional networks, generally known as "plastics." Such plastics are widely used to make heat-resistant articles that remain stable at 500 degrees F., for example. Common types include polyurethane, phenolics, melamine-formaldehyde, urea-formaldehyde, and amino resins. The addition of various fillers and other additives to make reinforced plastics is also well known.

SUMMARY OF THE INVENTION

The coffee bean is a well-known vegetable product composed of large organic molecules. Mixing and reacting coffee bean residue with a thermosetting polymer resin creates many new products having a variety of useful properties. These new products are structurally very hard, durable, insoluble, heat-resistant, shatter-proof, and biodegradable. One embodiment of the invention is a composition of matter comprising coffee bean residue and a thermosetting polymer.

When cured in a mold, such compositions form articles of manufacture, which is another embodiment of the invention. Such articles include home furnishing products, and kitchenwares, including plates, cups, saucers, bowls, and other dishes, vases, and storage containers. Commercial and industrial articles are also included, such as building blocks for structural and decorative uses.

Another aspect of the invention includes methods for making such articles of manufacture. For example, one method comprises the steps of grinding the coffee bean residue to a particle size of about 80 to 100 microns in diameter, followed by mixing about 3 parts by weight of the ground coffee waste powder with about 2 parts by weight of an amino resin, and about 1 part by weight starch. The mixture is thoroughly blended and then added to a mold that is preheated to about 100 to 140 degrees C. After a cure time of about 2 to 8 minutes, the article is removed from the mold, and may be polished to provide a smooth, glossy finish.

Other fillers and additives may be included in the compositions and articles of the invention. The nature of coffee bean waste is identified and discussed below, along with the preferred resins, fillers and additives.

Coffee Bean Residue

Coffee bean residue is a plentiful, inexpensive material frequently discarded by coffee plants and coffee shops as waste. Since coffee beans and the residue therefrom are biodegradable, and because the products of this invention contain large amounts of coffee bean residue, these new products are biodegradable and therefore they are environmentally desirable.

Coffee generates $15 billion dollars in annual revenue, making it the 2nd largest raw material economy in the world, behind petroleum. Roughly one-half of all coffee beans remains as waste after processing. This provides million of tons of coffee waste, which is a virtually unlimited supply of raw material for use in accordance with this invention.

Polyurethane

Polyurethane is a polymer consisting of the repeating unit —[—ROOCNHR'—]—$_n$ [8R8OOCNH8R'8]$_n$, where R may represent a different alkyl group than R'. Alkyl groups are chemical groups obtained by removing a hydrogen atom from an alkaline, a hydrocarbon containing all carbon-carbon single bonds. Most types of polyurethane resin cross-link and become thermosetting plastics. However, some polyurethane resins have a linear molecular arrangement that does not cross-link, resulting in thermoplastics.

Thermosetting polyurethane molecules cross-link into a single giant molecule. Thermosetting polyurethane is widely used in various forms, including soft and hard foams. Soft, open-celled polyurethane mixers foams are used to make seat cushions, mattresses, and packaging. Hard polyurethane mixers are used as insulation in refrigerators, freezers, and homes furnishing goods or appliances bodies. Thermoplastic polyurethane molecules have linear, highly crystalline molecular structures that form an abrasion-resistant material. Thermoplastic polyurethane mixers are molded into shoe soles, car fenders, door panels, and other products.

Phenolics

Phenolic (phenol-formaldehyde) resins, first commercially available in 1910, were some of the first polymers made. Today, Phenolics are some of the most widely produced thermosetting plastics. They are produced by reacting phenol ($C_6H_5OH$) with formaldehyde (HCOH). Phenolics plastics are hard, strong, inexpensive to produce, and they possess excellent electrical resistance. Phenolics resins cure (cross-link) when heat and pressure are applied during the molding process. Phenolics resin-impregnated paper or cloth can be laminated into numerous products, such as electrical circuit boards. Phenolics resins are also compression molded into electrical switches, pan and iron handles, radio and television casings, and toaster knobs and bases.

Melamine-Formaldehyde and Urea-Formaldehyde

Urea-formaldehyde (UF) and melamine-formaldehyde (MF) resins are composed of molecules that cross-link into clear, hard plastics. Properties of UF and MF resins are similar to the properties of Phenolics resins. As their names imply, these resins are formed by condensation reactions between urea ($H_2NCONH_2$) (H2NCONH2) or melamine (C3H6N6) (C3H6N6) and formaldehyde ($CH_2O$) (CH2O) Melamine-formaldehyde resins are easily molded in compression and special injection molding machines. MF plastics are more heat-resistant, scratch-proof, and stain-resistant than urea-formaldehyde plastics are. MF resins are used to manufacture dishware, electrical components, laminated furniture veneers, and to bond wood layers into plywood.

Urea-formaldehyde resins form products such as appliance knobs, knife handles, and plates. UF resins are used to give drip-dry properties to wash-and-wear clothes as well as to bond wood chips and wood sheets into chip board and plywood.

Amino Resin

Amino resins are versatile, low-cost cross-linkers for today's high-performance thermosetting coatings. A wide variety of amino products are available that offers advantage of flexibility in supply and price competitiveness in selecting the most suitable product for an application. Choosing the best cross-linker requires knowledge of its structure, including functional groups available to participate in reactions and molecular weight which is similar or adaptable to Coffee. Amino resins react readily with primary and secondary hydroxyl, carboxyl and amide-functional polymers, it creates strong and stable three dimensional bonding among coffee and other adding mixers. This is accomplished through reacting the amino resin with functional groups on the film-former and simultaneous self-condensation with other amino molecules. According to the data of world coffee production for the year 1999-2000, there are 75 coffee producing countries worldwide and the top 5 coffee bean producers and exporters were Brazil (27.17 million bags), Columbia (9.3 million bags), Indonesia (7.83 million bags), Vietnam (7.3 million bags), Mexico (6.2 million bags), they together represent about half of the total worldwide production.

Similarly, five major multi-national companies purchased more than 52% of the worldwide coffee bean: Nestle (15%), Kraft (14.5%), Sara Lee/Douwe Egberts (11%), Proter & Gamble (6.5%) and Tchibo-Eduscho (5%). All of them would either trash coffee bean waste or where feasible, used coffee bean waste as alternative fuel to generate heat or power for their factories. When heat or power is generated, the process in burning large quantity of coffee bean waste has also generated corresponding amount of carbon-dioxide and emitting other forms of undesirable gas, based on the fuel additives used.

In addition to dumping coffee beans waste at landfill or burned at incinerators, there are patents of commercial applications for using coffee bean waste as a material for Activated Carbon for deodorizing material (China patents CN1465521A), in the form of construction material (PCT/JP00/06264, WO02/16126), or compacting it to use it as fuel. By using large amounts of coffee bean waste as a constituent within thermoplastic polymer blends, with other filler and binging material, we have successfully created a new biodegradable material that is called "Coffeelastic." Other than using coffee bean waste in powder form as an active component in the mixing composition, coffee bean waste powder has been one of the most authentic coloring. Since a composition can be manipulated with a varying degree of coffee mix ratio, a desirable article is capable of demonstrating different coffee-color levels as an option.

Starch

Granular water-insoluble starch is added as an inert filler to complete the process. Starch is used primarily as a binding material to glue or adhere solid constituents together in forming a hetero-genius mixture of components. The polarized character of coffee bean waste is chemically compatible with starch, which is highly polarized due to existence of hydroxyl groups on approximately half of carbon atoms. Having coffee bean waste represent as largest active component in the blend, coffee grease is extracted by high temperature and high pressure in the process. Typically, plasticizers used to enable the formation of starch melts are either highly volatile liquids at the melting point such as water, or low volatile liquids such as glycerin. In the process of formulating Coffeelastic, the coffee grease will react with the granular starch mixer to form a new chemical bonding. Starch is used as a binder, as a thermo plastically processible constituent within coffee bean waste and other thermoplastic polymer blends, and as a thermoplastic material in itself.

Examples of patents that demonstrates the use of starch as a binder and, in particular, processes for molding articles from aqueous starch mixtures include U.S. Pat. No. 5,660,900 to Andersen et al.; U.S. Pat. No. 5,683,772 to Andersen et AL.; U.S. Pat. No. 5,709,827 to Andersen et al.; U.S. Pat. No. 5,868,824; and U.S. Pat. No. 5,376,320 to Tiefenbacher et al. For purposes of disclosing compositions, methods, and systems for molding aqueous starch mixtures that are subsequently dried so as to form a binding matrix of dried starch which binds together concrete solid materials such as fibers and particulate fillers. The foregoing patents have been incorporated herein for specific reference.

There are circumstances where attempts were taking place to use starch as a thermoplastic material, either alone or as a component within thermoplastic blends. Native starch does not typically behave as a thermoplastic material in itself but has to be heated in presence of plasticizers. Typically, the plasticizer has to be a liquid (at least when raised to the resulting gelatinization or melting point of starch) and it also has to be somewhat polarized in order to be chemically compatible with starch, which is itself highly polarized due to the existence of hydroxyl groups on approximately half of carbon atoms. Typically, plasticizers used to enable the formation of starch melts are either highly volatile liquids at the melting point such as water, or low volatile liquids such as glycerin.

Starch melts using water as the plasticizing solvent have been referred in art as "destructurized starch". Starch is said to be "destructurized" because it ceases to be a solid granular particulate as found in its native state. Moreover, it is said to be "destructurized" because the dissolution or melting of starch in the presence of water is an irreversible process. Starch that has been dissolved into or melted in the presence of water can never return to its native, granular state. Upon re-solidification of a melt of destructurized starch, typically by cooling below its melting or softening point, it will yield an essentially amorphous or semi-crystalline starch material that is self-supporting or "form stable", but only so long as water content is kept above at least 5% by weight of the starch and water mixture during the entire process including during cooling, preferably above at least 10%. Otherwise, the starch will tend to re-crystallize into a brittle material instead of forming a more amorphous and less brittle solid.

The use of "destructurized starch" as a commercial thermoplastic material has been limited for a number of reasons, including difficulty in processing, poor long term mechanical properties, high sensitivity to fluctuations in ambient moisture, including poor dimensional stability, and the difficulty of forming homogeneous blends of destructurized starch with more hydrophobic polymers that are less sensitive to fluctuations in moisture. Examples of patents that disclose the manufacture of "destructurized starch" and blends of destructurized starch and other polymers include U.S. Pat. No. 4,673,438 to Wittwer et AL.; U.S. Pat. No. 4,900,361 to SACHETTO et al.; U.S. Pat. No. 5,095,054 to Lay ET AL.; U.S. Pat. No. 5,256,711 TO TOKIWA ET AL.; U.S. Pat. No. 5,275,774 to Bahr et AL.; U.S. Pat. No. 5,382,611 to Stepto et AL; U.S. Pat. No. 5,405,564 to Stepto et AL.; and U.S. Pat. No. 5,427,614 to Wittwer et al. For purposes of disclosing compositions and methods for manufacturing "destructurized starch" compositions, including blends of "destructurized starch" and other polymers, the foregoing patents are incorporated herein by specific reference.

Others have shown that it is preferable to greatly reduce the amount of water in starch melts by replacing the water inherently found in starch with an appropriate low volatile plasticizers capable of causing starch to form a thermoplastic melt below its decomposition temperature, such as glycerin, polyalkylene oxides, mono-and diacetates of glycerin, sorbitol, other sugar alcohols, and citrates. In the process of formulating Coffeelastic, we have discovered that natural coffee grease which is extracted from applied temperature and pressure is one of the best plasticizers. Natural coffee grease allows for improved processability, greater mechanical strength, better dimensional stability over time, and greater ease in blending the starch melt with other polymers compared to "destucturized starch". Thermoplastic starch material in which most or all of water is replaced by a low volatile plasticizers, either before or during the process, are variously referred to as "thermo plastically processable starch" and "thermoplastic starch".

Every year in the United States alone, individuals trash millions of tons of plastics—of the estimated 190 million metric tons (420 billion pounds) of municipal waste collected annually in the United States, about 9 percent are plastics. Landfill after landfill reach their full capacity, additional landfill spaces are taken with new available landfill spaces diminished across the United States. Accordingly, alternative methods for reducing and disposing of wastes properly, including plastics, have been aggressively explored. Some of these options include reducing consumption of plastics, use of biodegradable plastics, and incinerating or recycling of plastic waste.

Biodegradable Plastics

Most plastics cannot readily break down into simpler components due to their molecular stability. Plastics are therefore generally not considered biodegradable. However, biodegradable plastics such as Coffeelastic will disintegrate over specified period of time due to bacterial actions or exposure to sunlight. For example, by incorporating starch molecules into certain thermosetting plastic resins in a manufacturing process will allow commonly occurring bacteria to "eat" into starch molecules when same plastics are collected in landfills. This process causes polymer molecules to break apart, allowing Coffeelastic to decompose. Exposure to sunlight is another method that Coffeelastic can disintegrate. Prolonged exposure to ultra-violet radiation from the sun makes Coffeelastic molecules to become brittle and slowly break apart. We are creating specific Coffeelastic that will degrade faster with exposure to sunlight, but slow down the biodegradable process during its life cycle of normal use.

Incineration

Certain solid wastes such as paper, plastics, wood, and other flammable materials can be burned in incinerators. The resulting ash demands much less space for disposal than the original waste in the solid form would otherwise require. But incineration of plastics is capable of producing hazardous emissions and other pollutants into the air. The incinerations method has been regulated and discouraged where possible. The present invention relates to compositions and methods for manufacturing coffee bean waste formulated compositions and articles made by the coffee bean waste formulated compositions. The idea and concept of applying and re-deploy a natural waste material to produce other forms of biodegradable articles is aimed to generate environmental benefits and economical value to the mankind. The unique characters of coffee waste together with its distinct aroma and brownish color and its ability to filter airborne odors offer a variety of commercial applications. These characters include acting as a deodorant in household appliances, flavor-keeping containers, and acting as an authentic coffee colorant, to name just a few. Such new compounds based on coffee bean waste formulated compositions incorporating several particulate filler components can result in various structurally stable materials suitable for commercial or industrial applications. Articles produced by biodegradable thermosetting coffee bean waste formulated composition can start to relieve high demand for petrochemical plastic consumption and capable to reduce environmental pollution associated with plastic waste. To make stronger materials and products where desirable, the coffee bean waste compositions can include one or more additional natural binding material or several other thermoplastic polymers blended with certain natural or artificial fibers for reinforcement to satisfy or exceed where possible public health and building safety standards. With an upward of more than three million tons of coffee bean waste generated and become available per year for collection and recycle, Coffeelastic production is feasible for both mass production and commercialization. It is a low cost, affordable and environmental friendly substitute for certain plastic products.

The present invention relates to a biodegradable thermosetting resin composition comprising a carbohydrate biomass substance supplied by coffee bean waste or from a blend of coffee bean waste with starch.

The present invention relates to a biodegradable thermosetting resin composition comprising a carbohydrate biomass substance from coffee bean waste. The waste material can be washed by water and dried to achieve less than 15% moisture content.

The resulting composition can be grinded into different fine particles sizes of between 20 um to 100 um in meeting criteria for different thermosetting applications. The present invention relates to some thermosetting resins which are polyurethane, phenol, melamine formaldehyde, urea formaldehyde or amino.

The present invention relates to a biodegradable thermosetting resin composition comprising a carbohydrate biomass substance and at less one or more blending reactive substance having the melting point of between 100 to 140 degree C.

The biodegradable thermosetting resin composition contains a carbohydrate biomass substance blends with melamine, phenol, urea, amino or polyurethane and which reactive substance having the melting point range between of 100 to 140 degree C. in the presence of a catalyst.

The biodegradable thermosetting resin composition contains a carbohydrate biomass substance that blends with melamine, phenol, amino or polyurethane and which reactive substance having the melting point range between of 100 to 140 degree C. in the presence of a catalyst and the catalyst is the coffee grease already present in the coffee bean waste.

EXAMPLE 1

A method for making biodegradable Coffeelastic kitchenware. In this process, we used coffee bean residue as the major component in the composition. The coffee bean waste was rinsed in clean tap water, and then dried and ground to a particle size of 80 to 100 microns. The ground coffee residue was then thoroughly mixed with starch and amino resin, to produce a substantially homogeneous blend. The formula is based on the concentration range for the coffee powder of approximately 30% to 50% by weight of solid, for the starch of approximately 5% to 20% by weight of solids, for the amino resin of a range between 10% and 40% by weight of solids. All materials blended in the composition were similar in granule size in order for achieve the most even mix in the blending process; and the moisture content was kept between 5% and 15%.

A mould was pre-heated for at least 20 minutes before starting the thermosetting process. Mold pressure was kept between 10 psi and 120 psi. Temperature was kept between 100 degrees and 140 degrees C. The thermosetting time required was not less than two minutes, and not more than eight minutes. Cooling time is required after the Coffeelastic article is formed, and the product is preferably polished to provide a final smooth finish.

EXAMPLE 2

A method to make a thermosetting biodegradable Coffeelastic building and home construction/renovation material. In this process, we used coffee bean waste as the major component in the composition. The coffee bean waste was rinsed with clean tap water and then ground to a particle size between 40 and 100 microns.

The ground coffee bean residue powder was then mixed with starch, melamine resin, talc, calcium carbonate, and a fibrous filler to yield a substantially homogeneous blend. The formula included a concentration range for the coffee powder of approximately 20% to 50% by weight, for the starch of approximately 0% to 5% by weight, for the melamine resin of a range between 5% and 45% by weight, for calcium carbonate of between 10% and 25% by weight, for talc of a range between 1% and 5% by weight of solid, and for fibers a concentration range between 5% and 15%. All the ingredients were provided in a particle size similar to the coffee powder, in order to achieve the most even mix in the blending process. The moisture content of the mixture was kept between 5% and 15%. The mold was pre-heated for 20 minutes before starting the thermosetting process. Pressure in the mold was kept between 50 psi and 250 psi; and the temperature was kept between 110 degrees C. and 150 degrees C. The thermosetting time required was not less than 3 minutes, and not more than 8 minutes. Cooling time was required after the Coffeelastic building and construction/renovation materials were formed. Both rough and fine polishing are preferable, to deliver a smooth, glossy finish.

EXAMPLE 3

A method to make a thermosetting biodegradable Coffeelastic deodorizing container. In this process, we used coffee bean waste as the major component in the composition. The coffee bean waste was rinsed with clean tap water and then ground to a particle size of approximately 80 to 100 mu. The ground coffee powder was then mixed with starch, amino resin, and fibers substantially homogeneously blended. The formula is based on the concentration range for the coffee powder of between 30% and 50% by weight of solid, for the starch of approximately 5% to 20% by weight of solids, for the amino resin of a range between 10% and 40% by weight of solids, and for fibers a concentration range between 1% and 5%. All materials blended in the composition were similar in particle size, in order to achieve the most even mix in the blending process. The moisture content of the mixture was kept between 8% and 15%. A double heat-setting container mold was pre-heated for not less than 20 minutes before starting the thermosetting process. Pressure in the mold was between 10 psi and 120 psi; and the temperature was between 100 degrees C. and 140 degree C. The thermosetting time required was between 2 minutes and 6 minutes for the first pressing.

After cooling, the Coffeelastic container was then returned to the mold for a second press, by adding a different coffee bean waste formulation mixture for applying a second inner layer inside the container. In the second press, the coffee mixture bind consisted of coffee bean waste powder of between 60% and 85% by weight of solid, for melanie resin of between 15% and 20% by weight of solid, for starch of between 2% and 5% by weight of solid, for natural fibers of between 1% and 5% by weight of solid. Pressure required was between 10 psi and 120 psi, and temperature was between 100 degrees C. and 140 degree C. The thermosetting time for the second press was between one minute and 8 minutes. The same process was employed to make a sealing lid for the container utilizing a lid mould. A complete set of food and beverage flavor-keeping container consists both container body and a lid.

EXAMPLE 4

A methods to develop a thermosetting biodegradable Coffeelastic building and home decorating material. In this process, we used coffee bean residue as the major component in the composition. The coffee bean residue needs to be rinse with clean water before it was dried and grinded between 40 to 100 mu by its' granuel size. A binding matrix of coffee, starch, melamine resin, and fibers substantially homogeneously blended throughout the mixing process. The formula is based on the concentration range for the coffee powder, melamine resin, calcium carbonate, talc and starch blend. Coffee residue was applied as a filler material and a brown colorant. We use different coffee residue ratio to achieve different coffee color shades, in Example 4, the darkest coffee color shade will be level one and the lightest coffee color shade will be level 4 under the listed mixing ratio table. All material blended in the composition shall be similar in it's granule size in order for achieve the most even mix in the blending process and the mixture should have moisture content for no less than 5% but no more than 15%. A mold should be pre-heated for no less than 20 minutes before the thermosetting process starts. The pressure is between 50 psi to 250 psi and the temperature is no less than 110 degrees C. but no more than 150 degree C. The thermosetting time is no less than 180 seconds but no more than 480 seconds.

The cooling time is require after the Coffeelastic articles are formed and a rough and another fine polishing are required to deliver the final shinning and smooth finishing. Depending on the % of coffee residue of each formula, final article will show different color shade in coffee color.

| Coffee Residue | | Melamine Resin | Starch | Calcium Carbonate | Talc | Fiber |
|---|---|---|---|---|---|---|
| 55-65% by weight | Color level 1 | 25-35% by weight | 3-5% by weight | 10-20% by weight | 2-5% by weight | 2-5% by weight |
| 45-55% by weight | Color level 2 | 35-45% by weight | 5-7% by weight | 10-30% by weight | 2-5% by weight | 2-5% by weight |
| 35-45% by weight | Color level 3 | 45-55% by weight | 7-9% by weight | 10-40% by weight | 2-5% by weight | 2-5% by weight |
| 25-35% by weight | Color level 4 | 55-65% by weight | 9-10% by weight | 10-40% by weight | 2-5% by weight | 2-5% by weight |

We claim:

1. A method comprising the steps of:
    mixing coffee bean residue and starch with a thermosetting resin, said residue having a particle size of 80 to 100 microns; and
    curing the mixture in a mold for two to eight minutes, at a temperature between 100 and 140 degrees C. and a pressure of 10 psi to 120 psi.

2. A method as in claim 1, further including the step of applying a second layer of thermosetting composition to the product produced, and returning the product and second layer to the mold for a second cure.

* * * * *